United States Patent Office 3,412,754
Patented Nov. 26, 1968

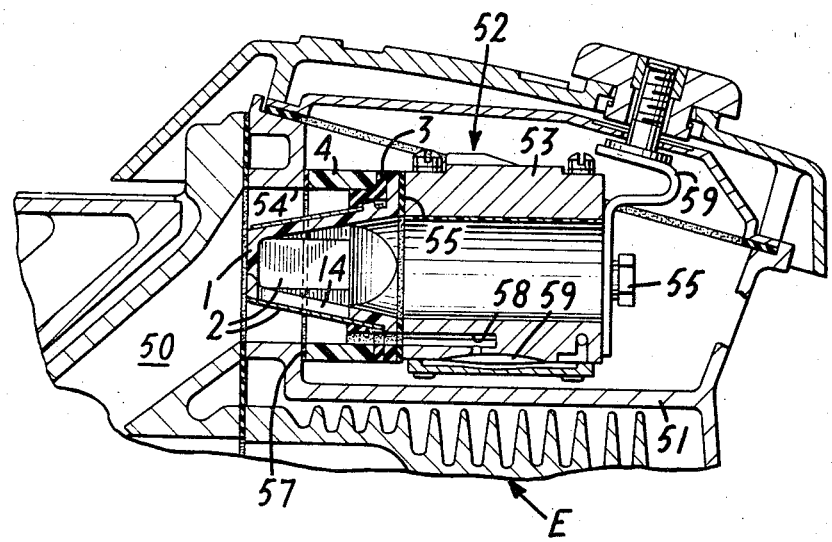

3,412,754
PYRAMID REED VALVE
Chris Schou, Greenwich, Conn., and Thomas F. Pelagalli, Mamaroneck, N.Y., assignors to Textron, Inc., Providence, R.I., a corporation of Rhode Island
Filed Mar. 15, 1966, Ser. No. 534,484
12 Claims. (Cl. 137—512.1)

ABSTRACT OF THE DISCLOSURE

A reed valve for an internal combustion engine comprises a truncated pyramidal valve seat member of molded plastic with valve openings in flat side walls. Resilient reeds overlying the valve openings have base portions engaging cooperating portion of the valve seat member to position the reeds acurately and are held in place by a retaining collar of elastomeric material.

---

The invention relates to valves and particularly to reed valves of the kind used in internal combustion engines. Such valves comprise a seat having one or more openings or ports for fluid flow, and one or more flexible reeds overlying the fluid flow opening or openings, and adapted to flex away from the valve seat by fluid pressure to permit flow of fluid in an outward direction, but engaging the valve seat to block flow of fluid in the opposite direction.

As used for example in fuel-air mixture supply systems of two stroke cycle internal combustion engines, reed valves commonly have valve seat members formed of metal stamplings, casting or forgings, and reeds of flexible sheet metal, plastic or other suitable material secured to the valve seat member by screws or rivets. Valves constructed in this manner present several disadvantages. They are relatively expensive, not only because of the cost of the parts, but also because of the amount of semi-skilled work required for assembly. The reeds must be placed on the valve seat member, screws or rivets inserted through holes in the reeds and screwed into tapped or riveted into holes in the valve seat member. As the holes in the reeds must be sufficiently large to permit facile insertion of the screws or rivets, the reeds are not accurately positioned by interengagement with the shanks of the screws or rivets. It is hence necessary to hold the reeds accurately in position by hand or with a suitable fixture while the screws or rivets are tightened. A further disadvantage arises from the fact that stress occurring in the reed when flexed is concentrated in the areas where the reeds are engaged by the screw or rivet heads. Because of this stress concentration, rapidly repeated flexing, for example at a rate of 4000 to 9000 cycles per minute during operation of the engine, eventually results in work fatigue and failure of the reed.

In an effort to overcome this defect, there is sometimes provided a back-up strip which overlies the base portion of the reed through which the screws or rivets extend. However, this increases the cost of the valve by reason of the adidtional parts and additional assembly time. While this expedient represents some improvement, stress is still concentrated in the reed adjacent the edge of the back-up strip. In case of failure of a reed valve, for example through the breaking of a reed or the breaking or loosening of the screws, any resulting loose parts may be drawn into the interior of the engine and cause serious damage.

It is an object of the present invention to overcome the disadvantages of present reed valve construction, and to provide an improved reed valve assembly which is easier and more economical to manufacture and has advantages operating characteristics.

In accordance with the invention, the valve seat member and base portions of the reeds are formed with interengaging portions which accurately position the reeds on the valve seat members without securing them in place. The interengaging means may, for example, comprise bosses or dowel studs on the valve seat member fitting closely into corresponding holes in the reeds. The reeds are then secured in place by retaining means of elastomeric material which presses the base portions of the reeds against underlying portions of the valve seat members.

The assembly of reed valves in accordance with the invention is materially simplified since the valves are assembled merely by placing the reeds on the valve seats and applying the retainer. There are no screws or rivets to insert or tighten. By reason of the close interfit of the interengaging portions of the reeds and valve seat members, the reeds are accurately positioned without requiring any special care and without the need of any jigs or fixtures.

The invention is particularly applicable to pyramid reed valves in which the valve seat member is of frusto-pyramidal shape with an apertured valve seat and cooperating reed on each of two or more sides of the pyramid. The retainer is advantageously in the form of a collar which slips over the valve seat member with the reeds placed thereon, and holds all the reeds in position.

While the valve seat member can be made of metal, a further feature of the invention in its preferred embodiment is that the valve seat member is molded of suitable plastic material. The molded plastic valve seat member has the advantage that it can be made more exactly to specified size and shape with well defined valve ports and a better finish including smoother and flatter valve seat surface which improve the operating characteristics of the valve. The molded plastic valve seat member also has better heat insulating characteristics, greater resiliency, lighter weight, and good resistance to abrasion, erosion and corrosion.

The invention will be more fully understood from the following description of a preferred embodiment illustrated by way of example in the accompanying drawings in which:

FIG. 1 is a somewhat schematic cross-sectional view showing the installation of a pyramid reed valve assembly in accordance with the present invention in the fuel-air mixture induction system of an internal combustion engine.

FIG. 2 is an end view of the reed valve assembly showing only the valve seat member, reeds and retainer.

FIG. 3 is a perspective view of the valve seat member.

FIG. 4 is a plan of one of the reeds.

FIG. 5 is a perspective view of the retainer.

FIG. 6 is a perspective view of a collar which fits on over the retainer, and

FIG. 7 is a perspective view of another valve seat member with one reed shown in dotted lines.

The invention is illustrated by way of example in the drawings as a pyramid reed valve suitable for use in the fuel air-mixture induction system of a two stroke cycle internal combustion engine. The valve illustrated in the drawing comprises a pyramidal valve seat member 1 (FIG. 3), four reeds 2 (FIG. 4), a retainer 3 (FIG. 5) and a collar 4 (FIG. 6).

The valve seat member 1 (FIG. 3) is shown as being of hollow frusto-pyramidal form, with four flat side walls 11, a top wall 12 and an annular flange portion 13, around the base of the pyramid. In each of the side walls 11 there is provided an opening or port 14 which is shown as being of approximately rectangular shape and is spaced upwardly from the flange 13. The portion of each side wall 11 surrounding the port 14 has a smooth outer surface lying in a plane and providing a valve seat for engagement by the reed 2.

The valve seat member 1 is provided with portions engaging each of the reeds 2 to position the reeds accurately relative to the valve seat and the port. Such positioning means is shown by way of example in the drawings as comprising integral bosses or dowels 15 projecting outwardly from the portion of each side wall 11 below the port 14, i.e., the portion between the port 14 and the flange 13. Two dowels 15 are shown provided on each side wall of the valve seat member. They preferably have a height equal to or greater than the thickness of the reeds and are preferably slightly tapered, for example, with an included angle of about 20 degrees. The taper facilitates molding of the valve seat member and the assembly of the reeds and contributes to accurate positioning of the reeds on the valve seats.

Upper and lower faces of the flange portion 13 of the valve seat member are approximately flat and approximately perpendicular to the axis of the pyramid. At two opposite sides of the flange portion 13, there are provided holes 16 adapted to receive bolts for mounting the reed valve in an engine as will be explained below. At the other two sides of the flange there are holes 18 providing passageways for transmitting pressure pulses from the engine crankcase to a fuel pump as will be more fully explained.

The valve seat member 1 is preferably formed complete in all respects as a single piece molded from suitable plastic material. Among materials suitable for use in molding the valve seat member are acetal resins such as a homopolymer known commercially as "Delrin" and a copolymer known commercially as "Celcon." Typical characteristics and properties of these resins are shown in the following table:

| Property | ASTM Test | Homopolymer "Delrin" | Copolymer "Celcon" |
| --- | --- | --- | --- |
| Tensile strength at yield, 73° F. (p.s.i.) | D638 | 10,000 | 8,800 |
| Tensile strength at break 73° F. (p.s.i.) | D638 | 10,000 | 8,000 |
| Tensile strength at break 70° F. (p.s.i.) | | 14,700 | |
| Elongation at yield, 73° F. (percent) | D638 | 15 | 12 |
| Elongation at break, 73° F. (percent) | D638 | 15 | 12 |
| Impact strength, izod-notched, 73° F. (ft. lb. per in.) | D256 | 1.4 | 1.1 |
| Impact strength, izon-notched, −40° F. (ft. lb. per in.) | D256 | 1.2 | 1.0 |
| Impact strength, Izod-unnotched, 73° F. (ft. lb. per in.) | D256 | 20.5 | 20.0 |
| Flexural yield strength, 73° F. (p.s.i.) | D790 | 14,100 | 13,000 |
| Shear strength, 73° F. (p.s.i.) | D732 | 9,510 | 7,700 |
| Flexural modulus, 73° F. (p.s.i.) | D790 | 410,000 | 375,000 |
| Fatigue endurance limit, 73° F. (p.s.i.) | | 5,000 | 4,400 |
| Deformation under load, 2,000 p.s.i. at 122° F. (percent) | D621 | 0.5 | 1.0 |
| Heat-distortion temperature, 264 p.s.i. (° F.) | D648 | 255 | 230 |
| Heat-distortion temperature, 66 p.s.i. (° F.) | D648 | 338 | 316 |
| Melting point, crystalline (° F.) | | 347 | 320 |
| Coefficient of linear thermal expansion, (per ° F.) | D696 | $4.5 \times 10^5$ | $4.5 \times 10^5$ |
| Water absorption, 24-hr. immersion (percent) | D570 | 0.25 | 0.25 |
| Rockwell hardness | D785 | M94 | 1.96 |
| Specific gravity | D792 | 1.425 | 1.41 |
| Abrasion resistance, Taber, 1,000-gm. load, CS-17 wheel (mg. per 1,000 cyices) | D1044 | 20 | 14 |
| Dielectric constant, 50% RH, 73° F., $10^2$ to $10^6$ cps | D150 | 3.7 | 3.7 to 3.8 |
| Dissipation factor, 50% RH, 73° F., $10^6$ cps | D3150 | 0.0048 | 0.004–0.005 |
| Dielectric strength, short time 8 mils (v. per mil) | D149 | 1,900 | 1,200 |
| Volume resistivity. (ohm per cm.) | D257 | $6 \times 10^{14}$ | $1 \times 10^{13}$ |

Of these two materials "Delrin" is presently preferred. Other plastic materials having suitable characteristics may alternatively be used, such, for example, as those known commercially as "Polypropoline" and "Teflon."

An advantage of molding the valve seat member of plastic material is that subsequent finishing operations are unnecessary. The finish on valve seat surfaces as molded has been found to be between 7 and 25 microinches. A further advantage arises from the fact that the plastic material has a lower coefficient of heat conductivity and thus contributes to thermally isolating the carburetor from the engine. For example, the coefficient of heat conductivity of "Delrin" is typically 1.6 (B.t.u.-in./° F.-ft.²-hr.).

The reeds 2 (FIG. 4) are formed of thin resilient material capable of flexing outwardly from the valve seat member to open the ports 14 and alternatively seating on the valve seat surfaces to close the ports. For example, the reeds can be cut from stainless steel sheet or strip material and suitably heat treated to provide the desired spring characteristics. For valves used in small internal combustion engines, stainless steel having a thickness of approximately 0.004 inch has been found satisfactory. Each of the reeds is shown as having a base portion 21 and a narrower tongue portion 22 of approximately rectangular shape. Curved edge portions 23 provide a transition from the base portion to the tongue portion so as to avoid concentration of stress when the reed is flexed. Holes 25 in the base portion 21 are positioned to receive the dowels 15 of the valve seat member 1 and are of a size to fit the dowels 15 snugly so as to position the reed accurately on the valve seat.

The retainer 3 is formed of elastomeric material which is firm yet elastically yieldable, for example, with a durometer value of about 70. For example, the material may be a synthetic rubber which is resistant to the fuels or other fluids with which the valve is to be used. The retainer comprises an approximately square collar portion 31 of a size to fit snugly over the lower portion of the pyramid of the valve seat member 1 with the reeds positioned thereon and a flange portion 33 adapted to overlie the flange portion 13 of the valve seat member. An upwardly projecting stud 32 is provided on the upper surface of the flange portion 33 near one corner. Inside corners 34 of the collar portion 31 are of small radius so as to be substantially square. In the inside surface of the collar portion there are provided recesses 35 to receive portions of the dowels 15 of the valve seat member which project beyond the reeds 2. The recesses 35 extend up from the bottom of the retainer 3 to a point high enough to accommodate the dowels 15, but preferably do not extend to the top of the retainer. Two opposite side portions of the flange 33 are formed with holes 36 adapted to line-up with holes 16 in the flange portion of the valve seat member 1 when the parts are assembled. Adjacent the holes 36, indentation 37 are formed in the outer surface of the collar portion 31. Smaller holes 38 in the flange portion and aligned indentation 39 in the outer surface of the collar portion are provided at the other two sides of the retainer in position to register with holes 18 in the flange portion of the valve seat member 1.

The size and shape of the flange portion 33 of the retainer 3 correspond to the flange portion 13 of the valve seat member 1 so that flange portion of the retainer seat on the flange portion of the valve seat member when the parts are assembled. The height of the retainer is approximately equal to the spacing of the ports 14 above the flange 13 of the valve seat member so that when the parts are assembled the retainer engages the base portions 21 of the reeds 2 and presses them resiliently against the underlying portions of the valve seat member 1. The retainer thus cooperates with the dowels 15 and interengaging holes 25 of the reeds to secure the reeds on the valve seat member and position them accurately with respect to the valve ports. Because of the resilient pressure exerted by the retainer 3, concentration of stress in the reeds is avoided when the tongue portions of the reeds are flexed outwardly away from the valve seats during operation of the valve.

The collar 4 is preferably molded of hard plastic material having a coefficient of thermoconductive less than that of metal, for example, a value of between 1 and 2. For example, a mineral-filled thermosetting resin such as that known commercially as "Durez" is satisfactory. The collar 4 is of a size and shape to fit over the retainer 3 and has an inner peripheral surface 41 fitting tightly over the collar portion 31 of the retainer 3 with bosses 42 fitting into indentations 37.

The outer periphery 43 is formed with an axially extending indentation 44 adapted to receive the stud 32 so as to orient the collar 4 to a predetermined position with respect to the retainer 3. End surface 45 and 46 of the collar 4 are substantially flat and parallel to one another. In addition to holding the retainer on the valve seat member when the valve is installed in an engine, the collar 4 serves as an additional heat dam thermally insulating the valve and carburetor from conduction of heat from the engine. It is of sufficient length to provide the desired insulation and to locate the valve and carburetor assembly in correct relation to the engine.

The valve is assembled by placing four reeds 2 on the valve seat member 1 with the dowels 15 of the valve seat member received in corresponding holes 25 of the reeds. The retainer 3 is pressed into an end of the collar 4 with the stud 32 of the retainer received in the indentation 44 of the collar, and the resulting subassembly comprising the retainer and collar is pressed down over the valve seat and reed assembly until the flange 33 of the retainer 3 engages the flange portion 13 of the valve seat member. The collar and retainer fit sufficiently tightly to retain them in assembled condition relative the valve seat member and one another.

In FIG. 7 there is shown another embodiment in which the valve seat member is provided at its corners with integral retaining ears 61 which interfit with projecting side portions 62 of the base portion of the reeds 2 and thereby accurately position the reeds on the valve seat member. The ears 61 hold the reeds against lateral movement and also against upward movement while engagement of the reeds with the flange portion 13 of the valve seat member 1 holds the reeds against downward movement. With this construction it is not necessary to perforate the reeds. The retainer 3 is shaped to accommodate the ears 61 when the parts are assembled and to press the base portion of the reeds resiliently against the underlying portions of the valve seat member.

In FIG. 1 there is illustrated a way of mounting a pyramid reed valve assembly in accordance with the invention in an engine having a fuel mixture induction passage 50 leading to the crank-case of the engine from a carburetor compartment 51 containing a carburetor assembly 52 including a casing 53. The reed valve assembly is sandwiched between the carburetor assembly and an outlet opening 54 in a wall of the carburetor compartment 51 communicating with the induction passage 50. The assembly is held in place by bolts 55 passing through aligned holes 16 of the valve seat member 1, holes 36 of the retainer 3 and holes 47 of the collar 4 and screwed into tapped holes in the wall of the carburetor compartment. A gasket 56 provides a fluid tight seal between the flange portion 13 of the valve seat member and the casing 53, and a gasket 57 provides a fluid tight seal between the collar 4 and the carburetor compartment. The flange portion of the retainer 3 serves as a gasket between the collar 4 and the flange portion of the valve seat member 1. Holes 18 and 38 in the flange portions of the valve seat member 1 and the retainer 3 and aligned grooves 39 in the collar portion of the retainer provide passageways communicating with one or more passages 58 in the casing 53 to transmit pressure vacuum pulses from the engine crank case to a diaphragm fuel pump indicated schematically at 59 for operating the pump. The carburetor compartment 51 is secured to the crank case by suitable screws or other fastenings (not shown).

In operation of the engine, the crank case is alternately at pressures below and above atmospheric pressures. When the pressure in the crank case is below atmospheric pressure, fuel-air-mixture is drawn from the carburetor assembly through the reed valves and passage 50 into the crank case. The fuel-air mixture flow flexes the reeds outwardly from their seats so as to permit free passage of the mixture through the valve. The mixture is then compressed in the crank case, return flow to the carburetor being blocked by the reed valves which close as soon as pressure reversal occurs. The reeds are held resiliently by engagement of the retainer 3 with base portions of the reeds 2 so as to avoid concentration of stress when the reeds are flexed. The retainer 3 and collar 4 inhibit puddling of the liquid fuel around the base of the reed valve assembly. They also provide thermal insulation between the engine crank case and the carburetor.

While it is presently preferred to use a collar such as the collar 4 illustrated and described between the retainer 3 and the fuel-air intake of the engine, the collar may in some instances be omitted so that the retainer 3 engages the portion of the engine on which the valve is mounted. In this event the flange portion 13 of the valve seat member is preferably made thicker—for example, twice as thick—in order to provide additional insulation against heat conduction from the engine crank case to the carburetor.

Further modification may be made within the scope of the annexed claims, it not being intended to limit the invention to the preferred embodiment shown by way of example in the drawing.

What I claim is:

1. A reed valve assembly comprising valve seat means having a valve opening, a flexible reed adapted to overlie and close said valve opening, said valve seat means and reed having interengaging portions for accurately positioning said reed relative to said valve seat means, said interengaging positioning portions comprising projections on said valve seat means projecting outwardly of said planar surface and portions of said reed engaging said projections, retainer means of elastomeric material overlying said positioning portion of said reed, and securing means for pressing said retainer against said positioning portion of said reed and thereby resiliently pressing said positioning portion of said reed against said valve seat means to retain said reed accurately positioned on said valve seat means.

2. A reed valve assembly according to claim 1, in which said valve seat means comprises a valve seat member of plastic material precision molded to form an accurate planar seating surface for said reed.

3. A reed valve assembly according to claim 1, in which said valve seat means comprises a valve seat member having a truncated pyramidal portion with a top surface and at least two side surfaces each with an opening therein and a flange portion at the base of said pyramidal portion, a reed being positioned on each of said side surfaces to overlie the respective opening.

4. A reed valve assembly according to claim 3, in which said retainer means comprises a collar seated on said flange portion and embracing adjacent portions of said pyramidal portion and of reeds positioned thereon.

5. A reed valve assembly according to claim 4, in which said securing means comprises an annulus overlying said retainer means and surrounding but spaced from said pyramidal portion of said valve seat member.

6. A reed valve assembly according to claim 5, in which said annulus is of hard molded plastic material.

7. A reed valve assembly according to claim 5, in which said annulus, collar and flange portion of said valve seat member have registering holes, and in which fastening means extends through said holes to hold said annulus, collar and valve seat member in assembled relationship.

8. A reed valve assembly comprising a valve seat member molded of plastic material and having a truncated pyramidal portion with at least two side walls each having a fluid-flow opening therein and having a precision molded planar surface surrounding said opening and a base portion with a peripheral flange, a resilient reed positioned on each of said side walls in a position to overlie the respective fluid-flow opening, said valve seat member having integral molded portions interengaging cooperating portions of said reeds to position each of said reeds precisely on the respective side wall of said valve seat member and means for retaining said reeds on said valve seat member.

9. A reed valve assembly according to claim 8, in which said retaining means comprises a collar of elastomeric material and means for securing said collar in position to press portions of said reeds resiliently against said valve seat member.

10. A reed valve assembly according to claim 1, in which said interengaging positioning portions comprise laterally projecting portions on said reed and ears on said valve assembly seat member engaging said projecting portions.

11. A reed valve assembly comprising walls defining a passageway, valve seat means positioned in said passageway and having side portions defining valve openings, a flexible reed overlying and adapted to close each of said openings, said side portions and base portions of said reeds having interengaging positioning portions for accurately positioning said reeds relative to said valve seat means, said interengaging portions of said reeds and valve seat means being spaced inwardly of said walls defining said passageway, and retainer means overlying said positioning portions of said reeds and pressing said positioning portions of said reeds against said valve seat means to retain said reeds accurately positioned on said valve seat means, said retaining means substantially filling the space between said positioning portions of said reeds and valve seat means and adjacent portions of said walls defining said passageway to inhibit puddling of liquid fuel in said space.

12. A reed valve assembly according to claim 11, in which said valve seat means comprises a truncated pyramidal portion comprising said side portions and a base portion fixed to said walls, and in which said retaining means comprises a collar of elastomeric material having a portion engaging said base portion of said valve seat means.

References Cited

UNITED STATES PATENTS

| | | | |
|---|---|---|---|
| 2,107,355 | 2/1938 | Winkler | 222—491 |
| 2,934,083 | 4/1960 | Norton | 137—512.1 XR |
| 3,042,013 | 7/1962 | Nelson | 137—454.4 XR |
| 3,118,467 | 1/1964 | Kohn | 137—512.1 |
| 3,286,728 | 11/1966 | Stephenson | 137—525.3 |

WILLIAM F. O'DEA, *Primary Examiner.*

WILLIAM H. WRIGHT, *Assistant Examiner.*